United States Patent [19]

Pusch

[11] 4,206,685

[45] Jun. 10, 1980

[54] HYDRAULIC TURNING DEVICE FOR A TURN PLOW

[75] Inventor: Gerhard Pusch, Hausach, Fed. Rep. of Germany

[73] Assignee: Erwin Hengstler Fabrik Hydraulischer Hebezeuge, Hausach, Fed. Rep. of Germany

[21] Appl. No.: 759,855

[22] Filed: Jan. 17, 1977

[30] Foreign Application Priority Data

Jan. 17, 1976 [DE] Fed. Rep. of Germany ....... 2601636
Jan. 17, 1976 [DE] Fed. Rep. of Germany ... 7601189[U]

[51] Int. Cl.² .................... F01L 25/02; F15B 11/15
[52] U.S. Cl. ...................................... 91/356; 91/318; 172/225
[58] Field of Search ................. 91/356, 318, 462; 172/225; 92/118

[56] References Cited

U.S. PATENT DOCUMENTS

| | | | |
|---|---|---|---|
| 2,169,470 | 8/1939 | Miller et al. | 91/318 |
| 2,389,661 | 11/1945 | Fischer | 91/356 |
| 2,925,806 | 2/1960 | Taylor | 91/335 |
| 2,953,118 | 9/1960 | Flick et al. | 91/462 |
| 2,979,369 | 4/1961 | Flick et al. | 92/118 X |
| 3,026,676 | 3/1962 | Wenzel et al. | 91/356 X |
| 3,106,938 | 10/1963 | Gordon | 91/463 X |
| 3,113,490 | 12/1963 | Weaver | 92/118 X |
| 3,353,453 | 11/1967 | Ramspeck | 91/356 |
| 3,800,537 | 4/1974 | Denis | 91/420 X |
| 4,036,106 | 7/1977 | Athy, Jr. | 91/420 X |

FOREIGN PATENT DOCUMENTS

1937382 2/1971 Fed. Rep. of Germany .......... 172/225
2363828 6/1975 Fed. Rep. of Germany .

*Primary Examiner*—Irwin C. Cohen
*Attorney, Agent, or Firm*—Michael J. Striker

[57] ABSTRACT

A hydraulic turning device for a turn plow comprises a substantially upright double acting cylinder having a piston dividing the cylinder into an upper and a lower compartment and being operatively connected to the turn plow for turning the latter in two steps between a first and a second through 180° reversed position. The upper and lower cylinder compartments are connected by fluid passage with a control device having a fluid inlet passage and a fluid return passage, and which is provided for reversing the movement of the piston in the cylinder wth a valve having an axially movable valve spool, a reversing piston and a reversing valve, in which the valve spool controls filling of the lower cylinder compartment. The control device includes further a pressure valve located between the upper cylinder compartment and the fluid return passage. The reversing piston controls filling of the upper cylinder compartment and is arranged in a fluid passage extending between the inlet passage and the upper cylinder compartment and provided with a non-return valve, whereas the reversing valve controls, dependent on the pressure acting thereon, movement of the reversing piston.

16 Claims, 6 Drawing Figures

HYDRAULIC TURNING DEVICE FOR A TURN PLOW

BACKGROUND OF THE INVENTION

The present invention relates to hydraulic turning devices for a turn plow connectable to a tractor. The turning device mainly comprises a substantially upright double-acting cylinder having a piston dividing the cylinder into an upper and a lower compartment, and the piston is operatively connected to the turn plow for turning the latter in two steps between a first and a second through 180° reversed position. The upper and the lower cylinder compartments are connected by fluid passage with a control device having a fluid inlet passage and a fluid return passage, and which is provided for reversing the movement of the piston in the cylinder with a valve having an axially movable valve spool, a reversing piston and a reversing valve. The valve spool controls filling of the lower cylinder compartment and also controls a pressure valve located between the upper cylinder compartment and the fluid return passage. The reversing piston is arranged in a fluid passage provided with a one-way valve, and extending between the inlet passage and the upper cylinder compartment and controls filling of the latter with pressure fluid, whereas the reversing valve controls, dependent on the pressure acting thereon, movement of the reversing piston. In a known construction of the aforementioned kind it is necessary that the two cylinder compartments of the hydraulic cylinder are connected with each other by a passage through the piston in which a one-way valve is arranged, whereby this passage, in the moment of the reversing of the piston movement, has to be closed by an additional closure means. Such a passage through the piston, the mounting of a one-way valve in the passage, and the additional arrangement of closure means complicate manufacture of the arrangement and require very close tolerances in order to assure trouble free function thereof. In this known construction, the control device forms the cover, respectively the bottom of the hydraulic cylinder and is welded to one end of the latter, and a flange is welded to the control device for tiltably mounting the hydraulic cylinder. In this arrangement is is necessary that the housing of the control device is formed from weldable material and this arrangement has the additional disadvantage that, during welding, the exact bores in the control device are subjected to distortion and usually have to be refinished.

SUMMARY OF THE INVENTION

It is an object of the present invention to provide a hydraulic turning device for a turn plow, which avoids the disadvantages of such turning devices known in the art.

It is a further object of the present invention to provide a hydraulic turning device of the aforementioned kind, which will assure an automatic reversing of the movement of the piston after it reaches one of its dead center positions without requiring auxiliary means to be operated from the outside.

It is an additional object of the present invention to provide a hydraulic turning device of the aforementioned kind, which has less parts than such turning devices known in the art and which can therefore be manufactured at smaller cost than such known turning devices and in which especially locking devices to be operated from the outside are unnecessary.

To accomplish these objects, the present invention provides a pressure control means between the inlet passage and the reversing valve, which maintains the pressure during the first step of turning below the pressure at which the reversing valve opens and which permits a further pressure build-up when the piston reaches its upper dead center position. In this way a connecting passage between the two cylinder compartments through the piston, the additional one-way valve, and the closure device, necessary in the arrangements of this type according to the prior art, are avoided, while nevertheless a secure reversing movement of the piston is obtained. The manufacture and assembly of the turning device according to the present invention is in this way considerably simplified. The aforementioned pressure control means are preferably constituted by a throttle, which is arranged in the control device between the inlet passage and the reversing piston. The price of such a throttle is considerably lower than that of a fluid divider, which might possibly be arranged instead of the throttle.

According to a further feature of the present invention, the passage means leading from the inlet passage to the upper cylinder compartment and passing over the reversing piston and the one-way valve is also passed over the valve spool and an overpressure valve. The arrangement is made in such a way that in the direction of the flow of fluid through the aforementioned passage means the pressure control means, the upper side of the valve spool, the reversing piston, the underside of the valve spool, the overpressure valve and the one-way valve will follow each other. This will assure that, especially with heavy plows, the pressure will not collapse, even if the pump which furnishes pressure fluid to the inlet of the device rotates with low speed in which the reversing valve could close and the reversing piston would move upwardly with the result that the valve spool opens the pressure valve to cause therewith an undesired reversing of the piston. The overpressure valve will assure that a minimum pressure of for instance 130 bars, necessary for the reversal of the piston, is maintained to preclude thereby malfunction of the arrangement. The overpressure valve comprises a valve member which at one end cooperates with a valve seat, whereas the other end is subjected to atmospheric pressure, so that the overpressure valve operates with a constant pressure level, thereby eliminating the influence of eventual return pressures. The aforementioned passage means preferably comprises a channel section having one end communicating with the cylinder space in which the valve spool is reciprocably arranged so that the one end of the channel section may be opened and closed by the valve spool and in which this one end is arranged downstream of the reversing piston. In this way it is neccessary that before the inlet passage is connected with the upper cylinder compartment that the valve spool is raised so that the pressure valve and therewith the fluid return passage is closed.

According to a further feature of the present invention, a return flow control means is arranged in the return passage, which follows, in the direction of the flow of fluid through the return passage, the pressure valve, which is controlled by the valve spool of the valve means, and the return flow control means preferably consists of an adjustable throttle. In this way the speed of downward movement of the plow during reversing of the latter may be properly controlled. It is especially advantageous to arrange in the passage between the inlet passage and the lower cylinder compartment, and which passes over the pressure control means and the valve spool of the valve means, an additional fluid control means which influences the pressure of the hydraulic medium passing from the lower cylinder compartment to the return passage. The last-mentioned control means preferably comprises a throttle in the aforementioned passage, a by-pass passage communicating with the aforementioned passage to opposite side of the throttle therein and a one-way valve in the by-pass passage, permitting flow of fluid from the inlet passage into the lower cylinder compartment, while preventing flow in the opposite direction, so that the throttle in the further passage is short circuited during flow of fluid medium into the lower cylinder compartment.

In order to simplify the construction of the turning device, the hydraulic cylinder and the control device are rigidly connected with each other by means of a connecting member. This connecting member may be welded to the cover, respectively the bottom of the cylinder, whereas the control device is connected by screws to the connecting member so that the bores in the control device will not detrimentally be influenced by a subsequent welding operation. The connecting member is tiltably mounted by bearing means on a support. The connecting member is provided with bores therethrough which form part of the passage means connecting the control device with the upper and the lower cylinder compartments. In this way it is unnecessary to form the control device from weldable material and preferably it is constructed as a cast part. In this way additional finishing operations due to thermal distortion are avoided, the control device may be produced independent from the production of the hydraulic cylinder and subsequently thereto be connected in a simple manner therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
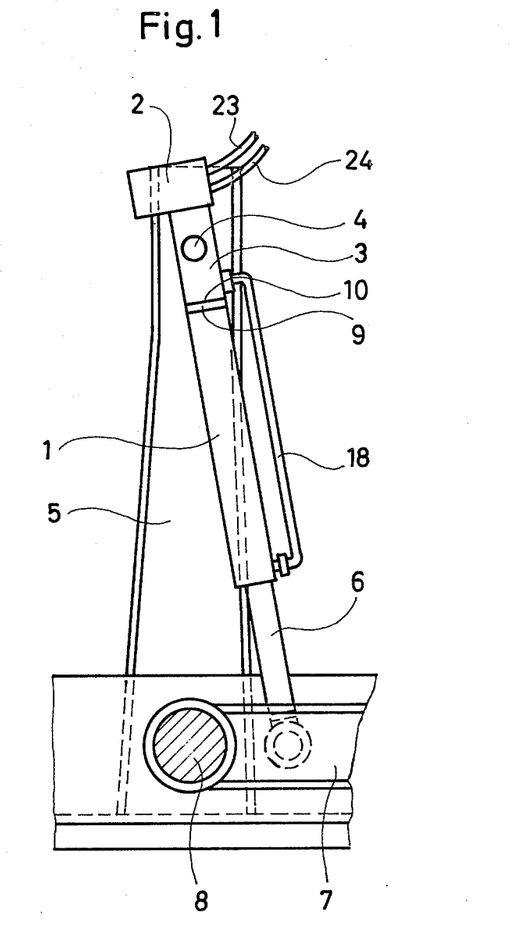
FIG. 1 is a schematic front view of the hydraulic turning device according to the present invention.

As shown in FIG. 1, the turning device according to the present invention comprises a hydraulic cylinder 1 and a control device 2 which are rigidly connected to each other by a connecting member 3, to form a unit which is tiltably mounted on a support 5 by a bearing 4 provided on the connecting member 3. A lever 7, only partly shown in FIG. 1, is connected to the free end of a piston rod 6 projecting from the hydraulic cylinder 1 and the lever 7 is connected to a shaft 8 turnably mounted in the support 5. The lever 7 serves for mounting the frame of a plow, not illustrated in the drawing, which by the turning device may be turned in two steps from a first to a through 180° displaced second position. For this purpose the piston rod 6 has to be moved in the cylinder 1 and after reaching its upper dead center position again moved out of the same. The reversing of the movement of the piston rod, respectively, the piston connected thereto, in the upper dead center position of the latter, is accomplished by the control device 2, in the manner as will be described later on and the control device 2 is connected by conduits 23, 24 to hydraulic means provided on a tractor, not shown in the drawing, to which the turning device is to be connected.

Figure 2:
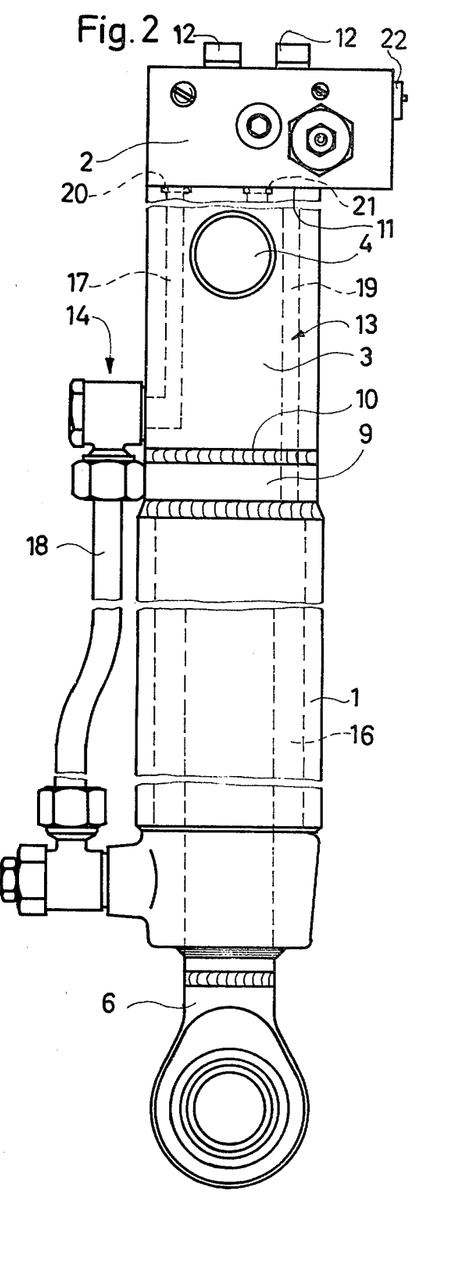
FIG. 2 is a front view of part of the arrangement shown in FIG. 1 and drawn to a larger scale than the latter.
Figure 3:
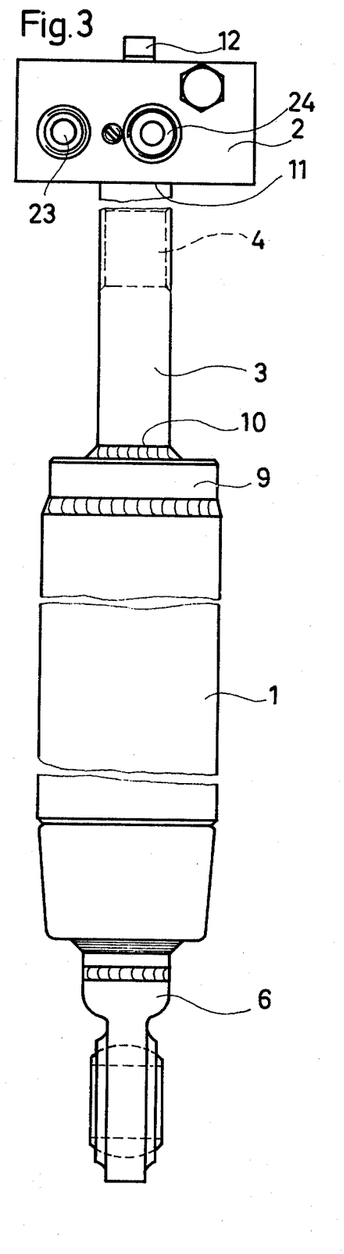
FIG. 3 is a side view of the arrangement shown in FIG. 2.

The unit, formed by the hydraulic cylinder, the connecting member 3 and the control device 2, is illustrated in further detail in FIGS. 2 and 3. As shown in these Figures, the hydraulic cylinder 1 is closed at its upper end by cover 9 welded thereto and the lower end face 10 of the connecting member 3 is in turn welded to the cover 9. The control device 2 abuts against the upper end face 11 of the connecting member 3 and is held thereon by a pair of screws 12 passing through the control device 2. The control device 2 is connected by passage means 13 and 14 with the upper cylinder compartment 15, respectively the lower cylinder compartment 16 of the hydraulic cylinder. The passage means 14 comprise a bore 17 in the connecting member 3 and an outer conduit 18 connected thereto. The passage means 13 comprises a bore 19 through the connecting member 13 which is continued by a bore through the cover 9. Appropriate sealing means 20 and 21, arranged in recesses at the upper ends of the bores 17 and 19, will assure a proper seal between the passage means 13, 14 and the control device 2. FIG. 2 also shows part of an overpressure valve 22 arranged at one side of the control device 2, whereas FIG. 3 shows joints provided on the control device 2 for connecting an inlet passage 23 and a return passage 24 thereto.

Figure 4:
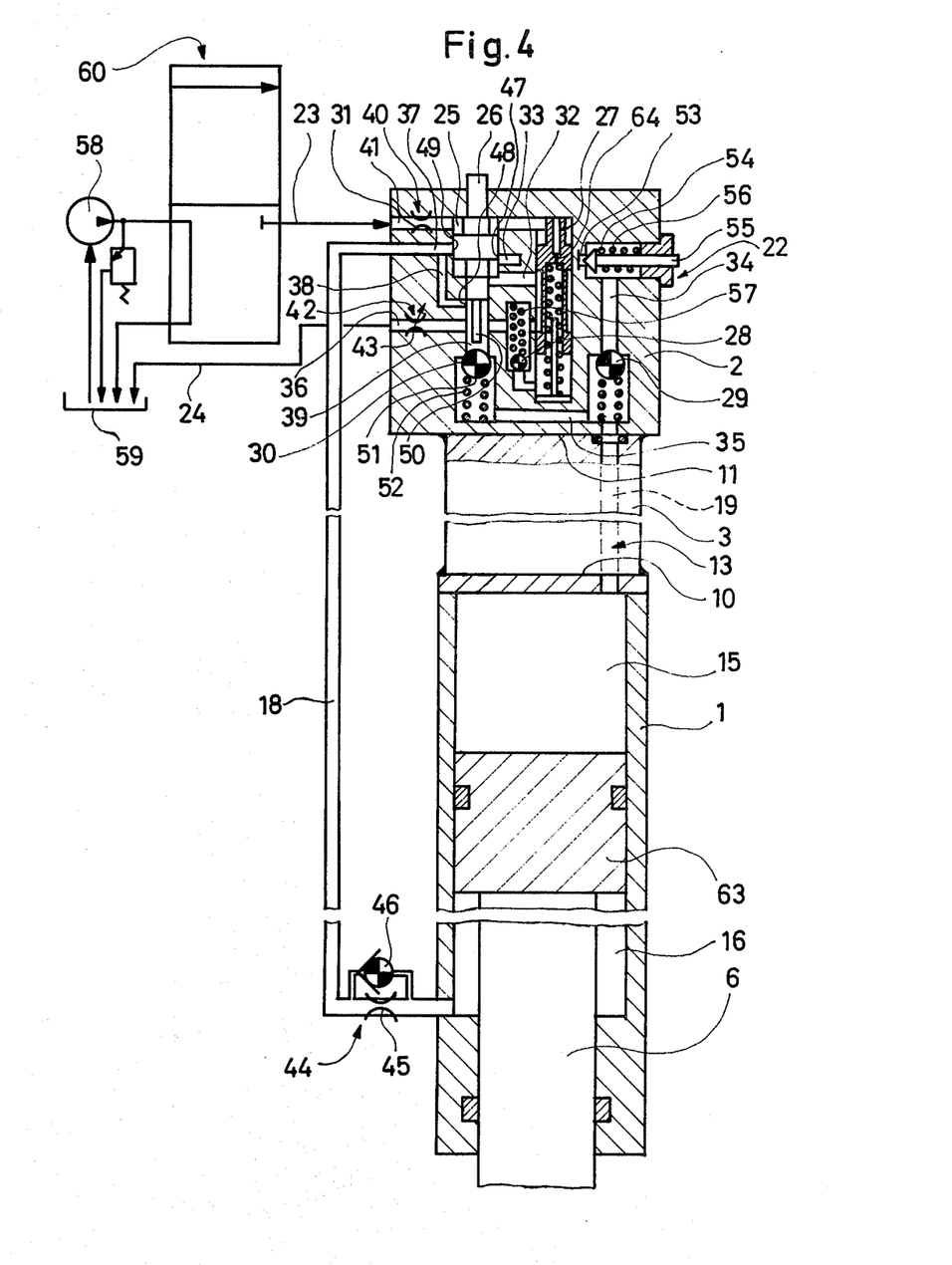
FIG. 4 is a schematic cross-section through the turning device and showing the various elements in neutral positions.

As shown in FIG. 4, the control device 2 mainly includes valve means constituted by a cylinder space 25 and a valve spool 26 reciprocably guided therein, a reversing piston 27, a reversing valve 28, the aforementioned overpressure valve 22, a one-way valve 29 and a pressure valve 30, as well as the necessary connecting passages between the aforementioned members. The arrangement is made in such a manner that the hydraulic pressure fluid passing from the inlet passage 23 to the upper cylinder compartment 15 will pass from the inlet passage 23 through a channel 31, the cylinder space 25 of the valve spool 26, over the upper pressure face of the latter, the reversing piston 27, the channel 32, back into the cylinder space 25, past the lower pressure face of the valve spool 26, the channel section 33, the overpressure valve 22, the passage 34, the one-way valve 29, and the bore 13 in the connecting member 3. The connection of the upper cylinder compartment 15 with the return flow passage 24 is established through the bore 13, the channel 35, the pressure valve 30, when the latter is opened by the extension 50 of the valve spool 26, and the channel 36. Pressure fluid from the inlet passage 23 to the lower cylinder compartment 16 is provided through the channel 31, the cylinder space 25 of the valve spool 26, the bore 37, the bore 17, and the outer conduit 18. In the schematic illustrations of FIGS. 4–6, the bore 17 is not shown and the outer conduit 18 is directly connected to the bore 37. Flow of hydraulic fluid from the lower cylinder compartment to the return passage 24 will pass through the outer conduit 18, bore 17, bore 37, the connecting channel 38, the intermediate space 39 provided below the valve spool 26 and the channel 36 communicating with the return passage 24.

Pressure control means 40, constituted by a throttle 41, are arranged in the channel 31, a return flow control means 42, likewise in form of a throttle 43, is provided in the channel 36, and the outer conduit 18 is provided, in the region where it communicates with the cylinder 1, likewise with a control means 44 for controlling the pressure fluid medium passing from the lower cylinder compartment 16 to the return passage 24. This control means 44 comprises a throttle 45 arranged at the aforementioned portion of the conduit 18, a by-pass passage communicating at opposite ends with the conduit 18 to opposite sides of the throttle 45 provided therein, and a one-way valve 46 in the by-pass passage permitting flow of fluid medium from the inlet passage into the lower cylinder compartment 16, while preventing flow in the opposite direction, so that the throttle 45 is short-circuited during flow of fluid medium into the lower cylinder compartment 16.

The valve spool 26 has, as mentioned before, an upper and a lower pressure face which have different areas adapted to be impinged by pressure fluid. The valve spool 26 controls the end 47 of the channel section 33 which communicates with the cylinder space 25, as well as the end 49 at which the channel or bore 37 communicates with the cylinder space 25, and the valve spool 26 has an extension 26 projecting downwardly therefrom to control the pressure valve 30, the ball 51 of which is pressed by a biasing means in form of a compression spring 52 against its seat. The other end 53 of the channel section 33 forms a valve seat for the cone 54 of a valve member 55 of the overpressure valve 22. The end of the valve member 55 opposite the cone 54 is subjected to atmospheric pressure. Biasing means, in form of a compression spring 56, press the valve cone 54 against the valve seat and the spring 56 is dimensioned in such a manner that the overpressure valve 22 will open only at a predetermined pressure, for instance 130 bars. The reversing valve 28 is pressed by biasing means in form of a compression spring 57 against its valve seat and the force of the spring 57, which is preferably adjustable in a manner not shown in the drawing from the outside, is adjusted in such a manner that the reversing valve 28 will open at a pressure of 100 bars acting thereon.

Figure 5:
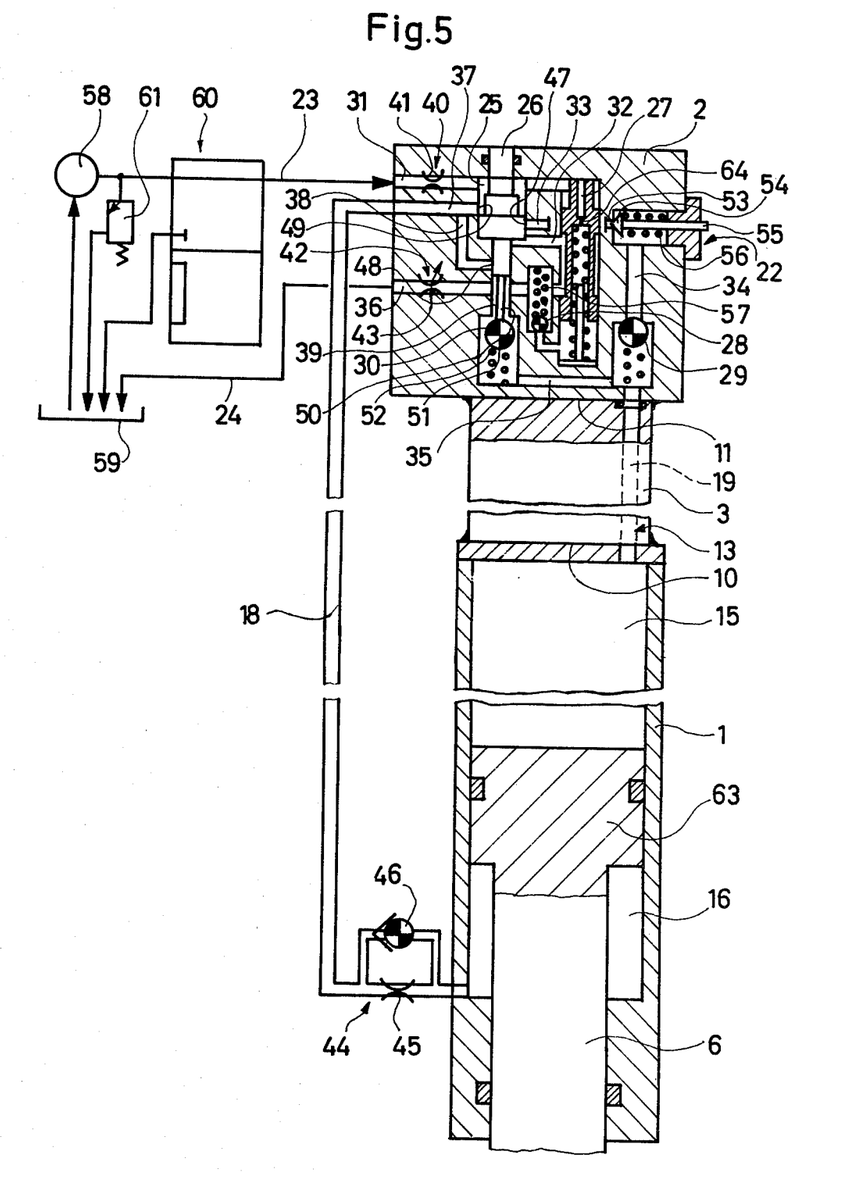
FIG. 5 is a cross-section corresponding to FIG. 4 and showing the device in a first step of the turning movement.
Figure 6:
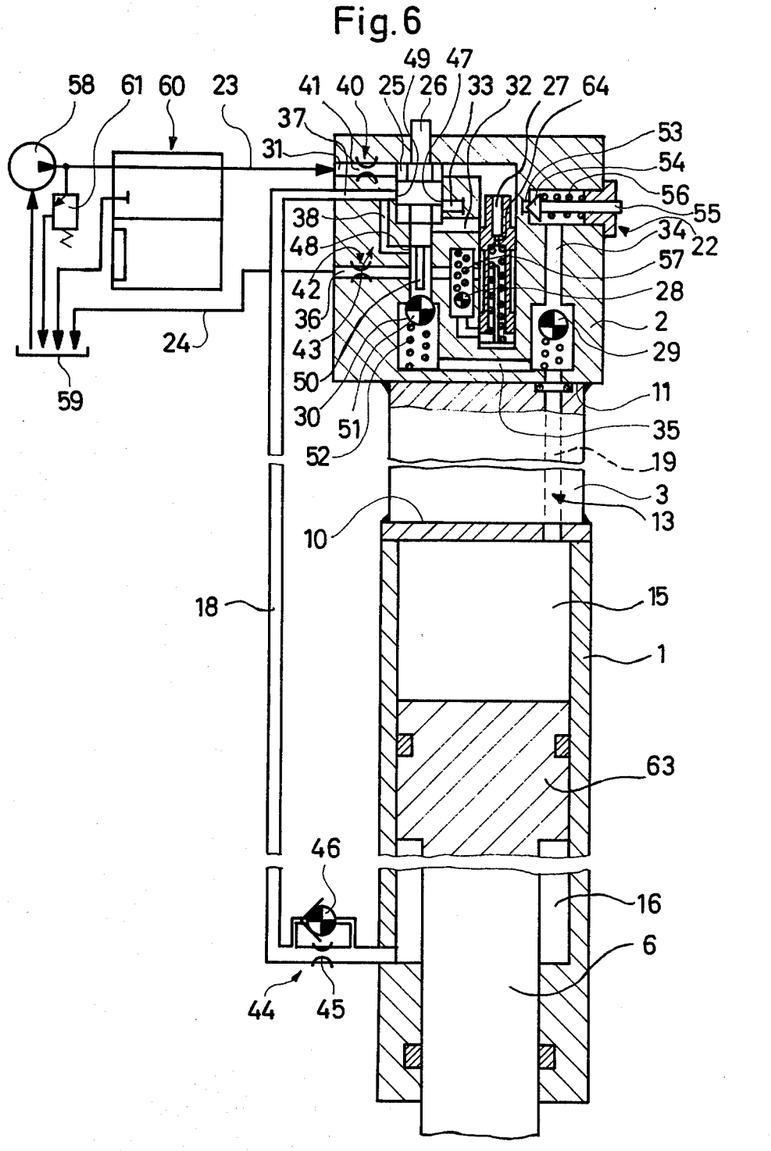
FIG. 6 is a cross-section similar to FIG. 5 and showing the turning device during a second step of the turning movement.

The inlet passage 23 and the return passage 24 are connected to fluid pressure supply means, which are usually provided on a tractor to which the hydraulic turning device is connected. As schematically shown in FIGS. 4–6, such fluid pressure supply means may include a pump 58, which pumps pressure fluid from a tank 59 over a two-way valve 60 to the inlet passage means 23, and the fluid may pass again to the tank 59 through the return passage. A safety valve 61 serves to limit the fluid pressure which is passed from the pump 58 to the inlet passage 23.

The above-described hydraulic turning device will operate as follows:

In the neutral position, as shown in FIG. 4, the inlet passage 23 is separated from the pump 58 by the two-way valve 60, in the position of the latter as shown in FIG. 4, and the pump pumps fluid from the tank 59 over the two-way valve 60 back into the tank. The piston rod 6, loaded by the weight of the plow, remains in the position shown in FIG. 1, since the fluid medium cannot escape from the upper cylinder compartment 15 and the one-way valve 29 and the pressure valve 30, likewise constructed as a one-way valve, will assure a complete seal, so that the position of the plow is locked. The lower cylinder compartment 16 is connected to the return flow passage 24, the valve spool 26 is maintained in its upper position in which it closes the end 49 of the bore 37, while opening the end 48 of the channel 38.

If the position of the plow is to be reversed, the two-way valve 60 is moved to the position shown in FIG. 5, so that the pump 58 is connected with the inlet passage 23. During the first step of the reversing movement, as illustrated in FIG. 5, the piston 63 in the cylinder 21 is moved upwardly. By the increasing pressure in the cylinder space 25 the valve spool 26 is moved downwardly, to open thereby the end 49 of the bore 37, while closing the end 48 of the channel 38. Hydraulic pressure fluid flows thereby from the inlet passage 23 to the lower cylinder compartment 16 and moves the piston 63 upwardly with a pressure of about 100 bars. Buildup of a higher pressure is not possible due to the throttle 41 and the movement of the piston 63, even though the pump 58 may furnish pressure fluid at a pressure of 150 to 200 bars, depending on the adjustment of the safety valve 61. The downwardly moving valve spool 26 opens thereby, by means of its extension 50, the pressure valve 30, so that hydraulic fluid from the lower cylinder compartment 15 may pass to the return passage 24 over the return control means 42, which will regulate the flow of fluid to the return passage such that the plow may not be lifted too fast. The pressure acting in the lower cylinder compartment 16 of about 100 bars will also act on the reversing valve 28, whereby the connection is produced over a throttle 64 in the reversing piston 27. The prevailing pressure is, however, not yet sufficient in order to open the reversing valve 28.

When the piston 63 has arrived at its upper dead center position, the pressure in the system will rise to the full pressure provided by the pump 58, since the throttle 41 cannot act in a pressure reducing sense when the piston 63 is at a standstill. The reversing valve 28 will now open (FIG. 6) so that the reversing piston 27 will be moved downwardly and open the channel 32. Both pressure faces of the valve spool 26 will now be under the same pressure. However, since the lower pressure face has a larger area than the upper one, the valve spool 26 will move upwardly to close thereby the end 49 of the bore 27 and as the extension 50 moves away from the ball 51 of the pressure valve 20 the latter will also close. The end 47 of the channel section 33 and the end 48 of the connecting channel 38 will however be opened. After opening of the overpressure valve 22 and the one-way valve 29, fluid may thus flow from the inlet passage 23 to the upper cylinder compartment 15 so that the piston 63 will be moved under full fluid pressure in downward direction, whereby hydraulic fluid in the lower cylinder compartment may pass to the return passage 24 and the tank 59. Thereby, the hydraulic fluid must pass through the throttle 45, which in turn will regulate the speed at which the plow is turned from one to the through 180° reversed position.

After the position of the plow has been reversed, the two-way valve 60 is again returned to the position shown in FIG. 4 so that the plow is again held positively in the reversed position. Especially by the arrangement of the pressure control means 40, the manufacture of the hydraulic turning device is not only essentially simplified, but also the operation thereof is improved, since the upper dead center position of the piston can vary within large limits so that the adjustment during assembly may be simplified.

It will be understood that each of the elements described above, or two or more together may also find a useful application in other types of hydraulic turning devices differing from the types described above.

While the invention has been illustrated and described as embodied in a hydraulic turning device for reversing the position of a turn plow, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic turning device for a turn plow connectable to a tractor, comprising substantially upright double-acting hydraulic cylinder-and-piston means including a piston axially reciprocable in the cylinder of said cylinder-and-piston means and dividing the cylinder into an upper and a lower compartment, said piston adapted to be operably connected to a turn plow for turning the latter in two steps between a first and a second through 180° reversed position; and a control device having an inlet passage for a hydraulic medium under pressure and a return passage for the medium and including valve means comprising a cylinder space communicating with the inlet passage, and a valve spool having opposed pressure responsive differential areas reciprocable in said cylinder space for controlling conduit means filling both said upper and said lower compartments with hydraulic fluid, pressure valve means located between said upper compartment and said return passage and controlled by said valve means, passage means between said inlet passage and said upper compartment, said passage means comprising a channel connecting said inlet passage with said cylinder space, a one-way valve in said passage means permitting flow of pressure medium from said inlet passage to said upper compartment while preventing such flow in the opposite direction, reversing piston means located in said passage means movable between two positions for controlling filling of said upper compartment with the pressure medium, pressure responsive reversing valve means movable between an open and a closed position, biasing means tending to maintain said reversing valve means with a predetermined pressure in said closed position, said reversing valve means being arranged for determining movement of said reversing piston between the positions thereof depending on the pressure acting thereon from said channel, and pressure control means in said channel upstream of said valve spool for maintaining the pressure acting on said reversing valve means during the first step of the turning operation below said predetermined pressure to keep said reversing valve means closed while increasing the pressure when the piston reaches its upper dead center position to open said reversing valve means.

2. A hydraulic turning device as defined in claim 1, wherein said pressure control means is in the form of a throttle.

3. A hydraulic turning device as defined in claim 1, wherein said passage means passes through said cylinder space and including an overpressure valve communicating with said passage means.

4. A hydraulic turning device as defined in claim 3, wherein said valve spool has a pair of opposite pressure faces, and wherein said pressure control means, said valve spool, said reversing piston means, said overpressure valve and said one-way valve are arranged in said passage means so that a pressure medium passing therethrough from said inlet passage to said upper cylinder compartment flows first through said pressure control means, then over one of said opposite pressure faces of said valve spool, then over said reversing piston means, the other pressure face of said valve spool, past said overpressure valve and finally through said one-way valve means when the latter is opened by the fluid pressure.

5. A hydraulic turning device as defined in claim 4, wherein said passage means further comprises a channel section having one end communicating with said cylinder space and being openable and closable by said valve spool, said one end being arranged downstream of the reversing piston means.

6. A hydraulic turning device as defined in claim 3, wherein said overpressure valve means comprises a valve seat, a valve member having one end cooperating with said valve seat and an opposite end subjected to atmospheric pressure, and biasing means for biasing said valve member into engagement with said valve seat.

7. A hydraulic turning device as defined in claim 1 and including return flow control means arranged in said return passage downstream of said pressure valve means.

8. A hydraulic turning device as defined in claim 7, wherein said return flow control means is constituted by an adjustable throttle.

9. A hydraulic turning device as defined in claim 8, wherein said adjustable throttle is arranged in said control device.

10. A hydraulic turning device as defined in claim 1, and including a channel in said control device connecting said one-way valve and said pressure valve means.

11. A hydraulic turning device for a turn plow connectable to a tractor, comprising substantially upright double acting hydraulic cylinder-and-piston means including a piston axially reciprocable in the cylinder of said cylinder-and-piston means and dividing the cylinder in an upper and a lower compartment, said piston adapted to be operably connected to a turn plow for turning the latter in two steps between a first and a second through 180° reversed position; a control device having an inlet passage for a hydraulic medium under pressure and a return passage for the medium and including valve means comprising a cylinder space communicating with the inlet passage, and a valve spool reciprocable between said cylinder space and arranged for controlling filling of said lower compartment with hydraulic fluid, pressure valve means located between said upper compartment and said return passage and controlled by said valve means, passage means between said inlet passage and said upper compartment, a one-way valve in said passage means permitting flow of pressure medium from said inlet passage to said upper compartment while preventing such flow in the opposite direction, reversing piston means located in said passage means movable between two positions for controlling filling of said upper compartment with the pressure medium, reversing valve means movable between an open and a closed position, biasing means tending to maintain said reversing valve means with a predetermined pressure in said closed position, said reversing valve means being arranged for determining movement of said reversing piston means between the position thereof depending on the pressure acting thereon, and pressure control means between said inlet passage and said reversing valve means for maintaining the pressure acting thereon during the first step of the turning operation below said predetermined pressure to keep said reversing valve means closed while increasing the pressure when the piston reaches its upper dead center position to open said reversing valve means; a connecting member for rigidly connecting said control device with said cylinder; support means; bearing means tiltably mounting said connecting member on said support means, said bearing means being arranged adjacent said control device; and further passage means between said cylinder space and said lower cylinder compartment, at least one of said passage means including bores through said connecting member.

12. A hydraulic turning device as defined in claim 11, and including screw connecting means for connecting said control device to said connecting member.

13. A hydraulic turning device as defined in claim 11, wherein said connecting member is a plate having opposite end faces, one of which being connected to said hydraulic cylinder and the other to said control device.

14. A hydraulic turning device as defined in claim 13, wherein said hydraulic cylinder has a cover on its upper end, and wherein said one end face of said connecting member is welded to said cover and the other end is held by said screw connecting means onto said control device.

15. A hydraulic turning device as defined in claim 1, and including a cover at the upper end of said hydraulic cylinder, said first-mentioned passage means including further a bore through said cover communicating at opposite ends with one of said bores in said connecting member and with said upper cylinder compartment, respectively, and wherein said further passage means further comprises a conduit located outside said hydraulic cylinder and communicating at opposite ends with the other of said bores in said connecting member and said lower cylinder compartment, respectively.

16. A hydraulic turning device as defined in claim 1, wherein the ends of said bores adjacent said control device are provided with concentric recesses, and including sealing means in said recesses.

* * * * *